(12) United States Patent
Xu et al.

(10) Patent No.: US 12,313,605 B1
(45) Date of Patent: May 27, 2025

(54) SINGLE-PULSE EXPERIMENTATION DEVICE BASED ON HOPKINSON PRESSURE BAR AND EXPERIMENTATION METHOD

(71) Applicant: SICHUAN UNIVERSITY, Chengdu (CN)

(72) Inventors: Nuwen Xu, Chengdu (CN); Zhuang Li, Chengdu (CN); Yong Xia, Chengdu (CN); Biao Li, Chengdu (CN); Peiwei Xiao, Chengdu (CN); Haoyu Mao, Chengdu (CN); Jun Liu, Chengdu (CN); Feng Gao, Chengdu (CN); Yuepeng Sun, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 18/882,860

(22) Filed: Sep. 12, 2024

Related U.S. Application Data

(63) Continuation of application No. PCT/CN2024/093482, filed on May 15, 2024.

(30) Foreign Application Priority Data

May 14, 2024 (CN) .......................... 202410592702.7

(51) Int. Cl.
*G01N 3/30* (2006.01)
*G01N 3/02* (2006.01)
*G01N 3/307* (2006.01)

(52) U.S. Cl.
CPC ....... *G01N 3/307* (2013.01); *G01N 2203/001* (2013.01); *G01N 2203/0019* (2013.01);
(Continued)

(58) Field of Classification Search
None
See application file for complete search history.

(56) References Cited

U.S. PATENT DOCUMENTS

| | | | |
|---|---|---|---|
| 2003/0139215 A1* | 7/2003 | Todd | F41B 15/025 463/47.6 |
| 2012/0012140 A1* | 1/2012 | Chen | A45B 19/04 135/24 |
| 2018/0274881 A1* | 9/2018 | Moran | F41B 15/022 |

FOREIGN PATENT DOCUMENTS

| | | |
|---|---|---|
| CN | 102359462 A | 2/2012 |
| CN | 104155197 A | 11/2014 |

(Continued)

OTHER PUBLICATIONS

Xi Tong, Deformation Mechanism Failure Behavior of Magnesium Alloy Under High Strain Rate, School of Materials Science and Engineering Shenyang University of Technology, 2013, pp. 1-48.
(Continued)

*Primary Examiner* — Matthew G Marini
*Assistant Examiner* — Ruben C Parco, Jr.
(74) *Attorney, Agent, or Firm* — Bayramoglu Law Offices LLC

(57) ABSTRACT

A single-pulse experimentation device based on a Hopkinson pressure bar and an experimentation method include an experimentation assembly and a pulse controlling assembly, the experimentation assembly includes a power generating mechanism, an incident bar and a transmission bar, a space between the incident bar and the transmission bar is for accommodating a sample, and the sample is for bearing and transferring a dynamic-loading compressional wave transmitted by the incident bar; the pulse controlling assembly includes: a stretching assembly that is internally hollow and is connected to the transmission bar; and an elastic assembly and a gear regulating mechanism that are located inside the (Continued)

stretching assembly, and are connected to corresponding positions of the stretching assembly, respectively; wherein the gear regulating mechanism is configured for driving the stretching assembly to switch between a first position state and a second position state.

11 Claims, 3 Drawing Sheets

(52) U.S. Cl.
CPC ............. *G01N 2203/0035* (2013.01); *G01N 2203/0048* (2013.01)

(56) References Cited

FOREIGN PATENT DOCUMENTS

| CN | 105022031 | A | | 11/2015 | | |
|---|---|---|---|---|---|---|
| CN | 105806698 | A | | 7/2016 | | |
| CN | 205719826 | U | | 11/2016 | | |
| CN | 106950101 | A | | 7/2017 | | |
| CN | 208669786 | U | | 3/2019 | | |
| CN | 109883849 | A | | 6/2019 | | |
| CN | 209027936 | U | | 6/2019 | | |
| CN | 210106321 | U | | 2/2020 | | |
| CN | 213628513 | U | | 7/2021 | | |
| CN | 113390725 | A | | 9/2021 | | |
| CN | 116559002 | A | | 8/2023 | | |
| CN | 116698626 | A | * | 9/2023 | ............. | G01N 3/02 |
| CN | 118392685 | A | * | 7/2024 | | |

OTHER PUBLICATIONS

Qinyong Ma, et al., Dynamic Behavior and Energy Evolution Characteristic of Deep Roadway Sandstone Containing Weakly Filled Joint at Various Angles, Advances in Civil Engineering, 2020, pp. 1-12.

Zhang Zhuzhuv, et al., Error Analysis of Interface Friction Effect of Metal Material in Split Hopkinson Pressure Bar Test, Materials for Mechanical Engineering, 2024, pp. 89-96, vol. 48 No. 2.

Li Xiaoqin, et al., Numerical Simulation of SHPB Dynamic Compression Test of Concrete, Journal of Mechanical Strength, 2018, pp. 901-907, vol. 40 No. 4.

Li Di-Yuan, et al., On the Effect of Length to Diameter Ratio of Rock Specimen Subjected to Dynamic and Static Compression, Journal of Experimental Mechanics, 2018, pp. 93-100, vol. 33 No. 1.

\* cited by examiner

SINGLE-PULSE EXPERIMENTATION DEVICE BASED ON HOPKINSON PRESSURE BAR AND EXPERIMENTATION METHOD

CROSS REFERENCE TO RELATED APPLICATIONS

This application is a continuation application of International Application No. PCT/CN2024/093482, filed on May 15, 2024, which is based upon and claims foreign priority to Chinese Patent Application No. 202410592702.7, filed on May 14, 2024, the entire contents of which are incorporated herein by reference.

TECHNICAL FIELD

The present application relates to the technical field of tests of mechanics of materials, and, more particularly, to a single-pulse experimentation device based on a Hopkinson pressure bar and an experimentation method.

BACKGROUND

The split Hopkinson pressure bar (SHPB) experimentation is a commonly used experimentation method of the mechanics of materials, and may be used to measure dynamic mechanical properties of materials under a dynamic impact load. When the dynamic mechanical properties of samples such as rocks are tested by using the SHPB experimentation system, the monitoring on the variation of the physical mechanic properties of the samples is usually based on the change generated after the samples undergo a single dynamic loading process.

In the conventional SHPB experiments, because there is a boundary effect between the bar body and the sample, the reflected stretching wave may be re-reflected at the end of the incident bar that contacts the sample to form a secondary compressional wave, resulting in repeated loading on the sample, so that the sample cannot be caused to bear the impact of a single dynamic-loading compressional wave. However, in the practical engineering, most of the samples do not have the boundary, so, in the true sample experiment conditions, the repeated loading may not happen. Therefore, in the SHPB experiments, the results of the monitoring on the dynamic mechanical responses of the samples are different from the dynamic responses that the samples actually generate, resulting in inaccurate results of the dynamic-loading mechanic test experiments.

SUMMARY

In order to solve the above problem, the first object of the present disclosure is to provide a single-pulse experimentation device based on a Hopkinson pressure bar, to solve the problem that the current experimentation devices cannot realize the single-pulse loading of the Hopkinson pressure bar. The second object of the present disclosure is to provide a Hopkinson-pressure-bar experimentation method to realize the accurate testing on the dynamic mechanical properties of the sample under the impact of a single pulse.

In order to achieve the first object, a single-pulse experimentation device based on a Hopkinson pressure bar is provided in the first aspect of the present disclosure, wherein the used technical solutions are:

the single-pulse experimentation device based on the Hopkinson pressure bar, wherein the device includes an experimentation assembly and a pulse controlling assembly, the experimentation assembly includes a power generating mechanism, an incident bar and a transmission bar, a space between the incident bar and the transmission bar is for accommodating a sample, and the sample is for bearing and transferring a dynamic-loading compressional wave transmitted by the incident bar;

the pulse controlling assembly includes:

a stretching assembly that is internally hollow and is connected to the transmission bar; and an elastic assembly and a gear regulating mechanism that are located inside the stretching assembly and are connected to corresponding positions of the stretching assembly, respectively;

the gear regulating mechanism is configured for driving the stretching assembly to switch between a first position state and a second position state; and when the stretching assembly has received the dynamic-loading compressional wave propagated by the transmission bar for a first time, the stretching assembly drives the gear regulating mechanism to drive the stretching assembly to switch from the first position state to the second position state, to, in a direction of the transmission of the dynamic-loading compressional wave, by using the elastic assembly, drive the stretching assembly to contract, so that the transmission bar and the sample are disengaged from contacting.

Optionally, the stretching assembly includes, sequentially arranged in an axial direction:

a first hollow bar connected to the transmission bar;

a second hollow bar movably embedded with the first hollow bar; and a third hollow bar movably embedded with the second hollow bar;

the second hollow bar is provided with one or more windows, and the third hollow bar is provided with one or more clips; each of the one or more clips is opposite to one of the one or more windows; and when the stretching assembly is in the first position state, the each of the one or more clips is clipped inside a corresponding window, and when the stretching assembly is in the second position state, the each of the one or more clips is disengaged from the corresponding window.

Optionally, the elastic assembly includes:

a tension-spring set having two ends connected to the second hollow bar and the third hollow bar, respectively;

when the stretching assembly is in the first position state, the tension-spring set is in a stretching state; and when the stretching assembly is in the second position state, the tension-spring set pulls the second hollow bar and the third hollow bar to approach each other, to cause the stretching assembly to contract.

Optionally, the elastic assembly further includes:

a first compression-spring set that is located between the first hollow bar and the second hollow bar; and when the stretching assembly is in the first position state, the first compression-spring set is in a compression state.

Optionally, the elastic assembly further includes:

a second compression-spring set that is located inside the third hollow bar and is closer to the one or more clips; and when the stretching assembly is in the first position state, the second compression-spring set is in a compression state, to restrict the one or more clips from disengaging from the windows.

Optionally, the gear regulating mechanism includes:

a gear center bar disposed at the third hollow bar;

a driving gear and a driven gear that are nested to a periphery of the gear center bar;

a driving rack having one end disposed at the first hollow bar, and other end extending through the second hollow bar and engaged with the driving gear; and one or more driven racks that are correspondingly connected to the one or more clips, and are engaged with the driven gear.

Optionally, a limiting stopper is disposed at one side of the driving rack that is away from the driving gear.

Optionally, a length of the incident bar is two times a length of the transmission bar.

Optionally, the experimentation assembly further includes:

a hydraulic jack connected to one end of the stretching assembly that is away from the transmission bar.

In order to achieve the second object, the second aspect of the present disclosure provides a Hopkinson-pressure-bar experimentation method, wherein the method is for performing a test of a dynamic mechanical property of the sample by using the single-pulse experimentation device based on the Hopkinson pressure bar according to the first aspect of the present disclosure, and the Hopkinson-pressure-bar experimentation method includes:

adjusting the pulse controlling assembly to an initial state, wherein the initial state characterizes that the stretching assembly is in the first position state;

placing the sample between the incident bar and the transmission bar;

knocking the incident bar by using a knocking bar in the power generating mechanism to generate the dynamic-loading compressional wave, wherein the dynamic-loading compressional wave is transmitted sequentially to the incident bar, the sample, the transmission bar and the pulse controlling assembly; and collecting and measuring the dynamic-loading compressional wave to complete the test of the dynamic mechanical property of the sample;

wherein the dynamic-loading compressional wave, when passing through the stretching assembly of the pulse controlling assembly, drives the gear regulating mechanism to drive the stretching assembly to switch from the first position state to the second position state, to, in the direction of the transmission of the dynamic-loading compressional wave, by using the elastic assembly, drive the stretching assembly to contract, so that the transmission bar and the sample are disengaged from contacting.

As compared with the prior art, the present application has the following advantages:

a single-pulse experimentation device based on a Hopkinson pressure bar, wherein the single-pulse experimentation device includes an experimentation assembly and a pulse controlling assembly, the experimentation assembly includes a power generating mechanism, an incident bar and a transmission bar, a space between the incident bar and the transmission bar is for accommodating a sample, and the sample is for bearing and transferring a dynamic-loading compressional wave transmitted by the incident bar; wherein the pulse controlling assembly includes: a stretching assembly that is internally hollow and is connected to the transmission bar; and an elastic assembly and a gear regulating mechanism that are located inside the stretching assembly, and are connected to the corresponding positions of the stretching assembly; the gear regulating mechanism is configured for driving the stretching assembly to switch between a first position state and a second position state; and when the stretching assembly has received the dynamic-loading compressional wave propagated by the transmission bar for the first time, the stretching assembly drives the gear regulating mechanism to drive the stretching assembly to switch from the first position state to the second position state, to, in the direction of the transmission of the dynamic-loading compressional wave, by using the elastic assembly, drive the stretching assembly to contract, so that the transmission bar and the sample are disengaged from contacting.

By using the solutions of the present application, when a test of the dynamic mechanical properties is performed to a sample, the power generating mechanism impacts the incident bar to generate a dynamic-loading compressional wave, and the dynamic-loading compressional wave passes through the incident bar and the sample and is transmitted to the transmission bar. When the sample is impacted by the first shock wave, the pulse controlling assembly has a critical effect: in the initial state, the pulse controlling assembly is in the first position state. When the dynamic-loading compressional wave has been transferred to the pulse controlling assembly via the transmission bar, the gear regulating mechanism is triggered and activated, to drive the stretching assembly to switch from the first position state to the second position state. When the stretching assembly is in the second position state, the elastic acting force of the elastic assembly works, to drive the stretching assembly to contract, and the contracting of the stretching assembly causes the transmission bar and the sample to be disengaged from contacting.

Accordingly, after impacted for the first time, the pulse controlling assembly can actively shorten the length, resulting in that the rear end of the sample loses the supporting base, so that the subsequent dynamic-loading shock waves cannot act on the sample, thereby the single-pulse loading of the Hopkinson-pressure-bar experiment is realized structurally.

Accordingly, the single-pulse loading more truly simulates the true dynamic-loading environment of the sample, and therefore the experiment result is the same as the actual dynamic response of the sample in the no-boundary conditions, so that the experiment result can accurately reflect the dynamic response of the material in the practical engineering conditions. This study facilitates to know the true behaviors and properties of the material in the high-speed dynamic-loading conditions, and provides more reliable technical support to engineering design, material optimization, and assessment and prediction of material properties.

The advantages of the method over the related art are the same as the advantages of the device over the related art described above, which is not discussed further herein.

BRIEF DESCRIPTION OF THE DRAWINGS

In order to more clearly illustrate the technical solutions of the embodiments of the present disclosure or the related art, the figures that are required to be used to describe the embodiments or the related art will be briefly described below. Obviously, the figures that are described below are some embodiments of the present disclosure, and a person skilled in the art can obtain other figures according to these figures without paying creative work.

DESCRIPTION OF THE REFERENCE NUMBERS

1: pulse controlling assembly; 11: first hollow bar; 12: second hollow bar; 13: third hollow bar; 14: first compression-spring set; 15: tension-spring set; 16: second compression-spring set; 17: gear center bar; 18: driving gear; 19: driven gear; 110: driving rack; 111: first driven rack; 112: second driven rack; 113: limiting stopper; 2: power generating mechanism; 3: knocking bar; 4: incident bar; 5: sample; 6: hydraulic jack; 7: transmission bar; and 8: experiment table.

DETAILED DESCRIPTION OF THE EMBODIMENTS

The technical solutions in the embodiments of the present application will be clearly and completely described below with reference to the drawings in the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

It should be noted that the test of the dynamic mechanical properties using the SHPB experimentation system as used herein is referred to monitoring the variation of the various physical characteristics and properties exhibited by the sample 5 when subjected to the high-speed dynamic loading, for example, damage and crack expansion, and residual strength. The sample 5 may include rock, concrete, ceramic, plastic, a composite material, a foam material, a damping material, a polymer, an explosive, a solid propellant material and so on.

It should be emphasized that the device of the present disclosure is particularly suitable for the study and test on brittle materials such as coal rocks. In the environments of mining engineering and deep geotechnical engineering, the engineering structures are frequently impacted by dynamic loads, and the study on the mechanical properties of the materials under the dynamic-loading impact is of significance for the controlling over the wall-rock stability. According to the problem raised in the background art, in the true rock dynamic-loading conditions, the rock sample is usually impacted by a single dynamic-loading compressional wave, and is not influenced by the boundary effect. In order to accurately describe and monitor the variation of the morphology and the mechanical characteristics of the rock sample after a single time of the dynamic-loading impact, the time quantity of the loading of the dynamic-loading stress wave must be accurately controlled, so that the subsequently collected data can be used to accurately analyze the behaviors and properties of the materials in the high-speed dynamic-loading conditions.

Figure 1:
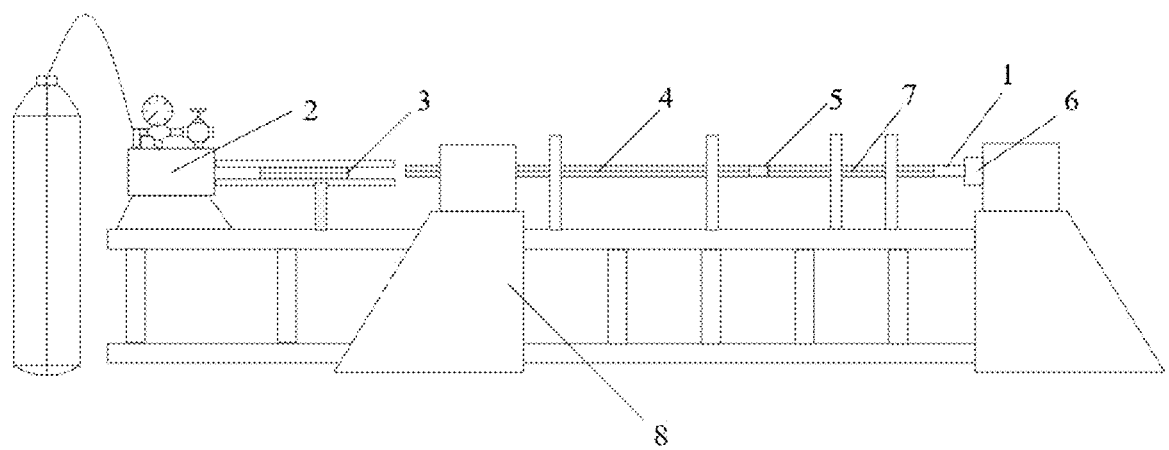
FIG. 1 is a schematic diagram of an overall structure of a single-pulse experimentation device based on a Hopkinson pressure bar according to an embodiment of the present application.

In order to overcome the defect of the existing experimentation devices that they cannot realize the single-pulse loading of the Hopkinson pressure bar, a single-pulse experimentation device based on a Hopkinson pressure bar is provided by the present disclosure. Referring to FIG. 1, FIG. 1 is a schematic diagram of an overall structure of a single-pulse experimentation device based on a Hopkinson pressure bar according to the present disclosure. The experimentation device includes an experimentation assembly and a pulse controlling assembly 1, the experimentation assembly includes a power generating mechanism 2, an incident bar 4 and a transmission bar 7, a space between the incident bar 4 and the transmission bar 7 is for accommodating a sample 5, and the sample 5 is for bearing and transferring a dynamic-loading compressional wave transmitted by the incident bar 4. The pulse controlling assembly 1 includes: a stretching assembly that is internally hollow and is connected to the transmission bar 7; and an elastic assembly and a gear regulating mechanism that are located inside the stretching assembly, and are connected to the corresponding positions of the stretching assembly, respectively. The gear regulating mechanism is configured for driving the stretching assembly to switch between a first position state and a second position state.

When the stretching assembly has received the dynamic-loading compressional wave propagated by the transmission bar 7 for a first time, the stretching assembly drives the gear regulating mechanism to drive the stretching assembly to switch from the first position state to the second position state, to, in the direction of the transmission of the dynamic-loading compressional wave, by using the elastic assembly, drive the stretching assembly to contract, so that the transmission bar 7 and the sample 5 are disengaged from contacting.

Particularly, the experimentation assembly may be understood as the major part of the operation of the entire experimentation device, and includes the power generating mechanism 2, the incident bar 4 and the transmission bar 7. The power generating mechanism 2 is referred to the device or mechanism that generates the impact load, and generally includes a power source, a power loading system and a knocking bar 3. The power source is connected to the power loading system, to apply the dynamic loading. The power loading system is connected to the knocking bar 3, and, by knocking the incident bar 4 at a high speed, simulates the impact load in practical applications, thereby the dynamic-loading compressional wave is generated.

In some embodiments, the power source may be a high-pressure gas flow, and correspondingly the power loading device is a pneumatic device, to push the knocking bar 3 by using compressed nitrogen or air. In some embodiments, the power source may be a hydraulic oil, and correspondingly the power loading device is a hydraulic driving device, to push the knocking bar 3 by using a hydraulic force. In some embodiments, the power source may be an electrodynamic force, and correspondingly the power loading device is an electromagnetic driving device, to quickly accelerate the knocking bar 3 by using the electromagnetic force.

The knocking bar 3, the incident bar 4 and the transmission bar 7 are located in the same axis. The incident bar 4 is located at one side of the knocking bar 3. The sample 5 is placed between the incident bar 4 and the transmission bar 7. The knocking bar 3 transfers the shock wave generated by the power loading device to the incident bar 4, the incident bar 4 transfers the dynamic-loading compressional wave to the sample 5, and the transmission bar 7 continues receiving the stress wave transferred by the sample 5, to analyze the mechanical response of the sample 5. When the power loading device drives the knocking bar 3 to knock the incident bar 4, a data collecting and processing system, by collecting the pulse signals of the incident bar 4 and the transmission bar 7, can obtain the parameters such as the stress and the strain acting on the sample 5.

It can be understood that the data collecting and processing system that the experimentation device is equipped with may be referred to a data collecting device and a data processing device. The data collecting device may include a pressure sensor, a strain gauge and so on. According to the collected pulse signals, that the dynamic response of the sample 5 is recorded includes recording the stress and strain responses of the sample 5 during the dynamic loading. The stress and strain responses are used for the subsequent mechanical analysis. The data processing device may be a computer, and the strain gauge transmits the collected pulse signals to the computer to perform data processing, to calculate the parameters of the sample 5 such as the stress-strain relation and the strain rate, thereby by analyzing those parameters, the mechanical properties of the materials are deduced.

It should be noted that the experimentation assembly may further be provided with an experiment table 8. The experiment table 8 may serve as the supporting system of the experimentation device, to provide support for the power loading device, the knocking bar 3, the incident bar 4 and the transmission bar 7 and restrict the knocking bar 3, the incident bar 4 and the transmission bar 7 to be merely able to move coaxially.

Preferably, a length of the incident bar 4 is 3 m, and a length of the transmission bar 7 is a half of the length of the incident bar 4, and is 1.5 m.

In some embodiments, the experimentation assembly further includes: a hydraulic jack 6 connected to one end of the stretching assembly that is away from the transmission bar 7. The pulse controlling assembly 1 is mounted to the experiment table 8 via the hydraulic jack 6.

A significant characteristic of the embodiments of the present disclosure is that the pulse controlling assembly 1 is added to the rear end of the transmission bar 7. The pulse controlling assembly 1 mainly includes the stretching assembly, the elastic assembly and the gear regulating mechanism, and the three major components, under the effect of the dynamic-loading compressional wave, jointly control the movement of the transmission bar 7, to realize the single-pulse loading. Particularly, the stretching assembly is connected to the transmission bar 7 and is internally hollow, to accommodate the gear regulating mechanism and the elastic assembly. One end of the outer contour of the stretching assembly is connected to and coaxially with the transmission bar 7, and, in the direction of the transmission of the wave, can receive the dynamic-loading compressional wave transferred by the transmission bar 7. The elastic assembly and the gear regulating mechanism are located at different positions inside the stretching assembly and are staggered, to prevent interference between each other.

In some embodiments, the elastic assembly may be a plurality of springs in different states of compression or stretching, and is used to provide predetermined elastic acting forces, to control the movement directions of the components connected the elastic assembly.

Particularly, the configuration of the gear regulating mechanism enables the stretching assembly to switch between the first position state and the second position state. In the present embodiment, the first position state and the second position state may be understood as the structural characteristics of the stretching assembly when the corresponding component parts of the stretching assembly are in a first position or a second position respectively. When the stretching assembly is in the first position state, the elastic acting force of the elastic assembly is suppressed, so that the overall structure of the stretching assembly maintains the original state; in other words, the overall length of the stretching assembly is not changed. When the stretching assembly is in the second position state, the elastic acting force of the elastic assembly is released, so that the elastic assembly connected to the stretching assembly drives the stretching assembly to move in the direction of the original state of the stretching assembly. In other words, the overall length of the stretching assembly is changed.

In some embodiments, the elastic assembly includes at least a spring in the stretching state, which is used to provide an elastic acting force having the trend of contracting, i.e., to cause the overall length of the stretching assembly to be reduced. When the stretching assembly has received the dynamic-loading compressional wave propagated by the transmission bar 7 for the first time, the gear regulating mechanism is triggered to drive the stretching assembly to switch from the first position state to the second position state. When the stretching assembly is in the second position state, the stretching assembly drives the overall axial length of the stretching assembly to be reduced. Accordingly, after impacted for the first time, the stretching assembly can actively shorten the length, to drive the transmission bar 7 to gradually leave the sample 5, so that the rear end of the rock sample loses the supporting base and the subsequent dynamic-loading shock waves cannot act on the rock sample.

Therefore, for the studying on the behaviors of the materials under a single time of impact, the experimentation device according to the embodiments of the present disclosure can prevent secondary loading, and the experiment result more accurately reflects the true dynamic response of the materials, which improves the accuracy and the reliability of the experiment data. Moreover, the present embodiment realizes the single-pulse loading of the Hopkinson-pressure-bar experiment structurally, has a simple principle and controllable experimentation, can be reused, and has economic benefit and very high teaching value.

By eliminating or minimizing the influence by secondary loading, the experiment data can more truly reflect the damage characteristics of the materials under the impact of a single dynamic loading, and thus can more accurately describe the properties of the materials in the conditions of extreme scenes such as blasting and knocking. Furthermore, it is extremely important for engineering design and material selection, and the periods of development and test of new materials, especially high-performance composite materials and advanced alloys can be shortened. Furthermore, the safety of engineering structures can be improved. Therefore, in the industries such as mining engineering, deep geotechnical engineering, aerospace, cars, and constructions, there may be a more accurate knowledge of the dynamic mechanical properties of materials, and engineers can be facilitated to better predict and prevent the behaviors of the materials in practical engineering, thereby the engineering quality and the safety are improved. In the fields of military and defense, there may be a depth knowledge of the behaviors of materials under a high-speed impact, which is of importance for the designing of impact-resistant equipment and protecting systems.

Figure 2:
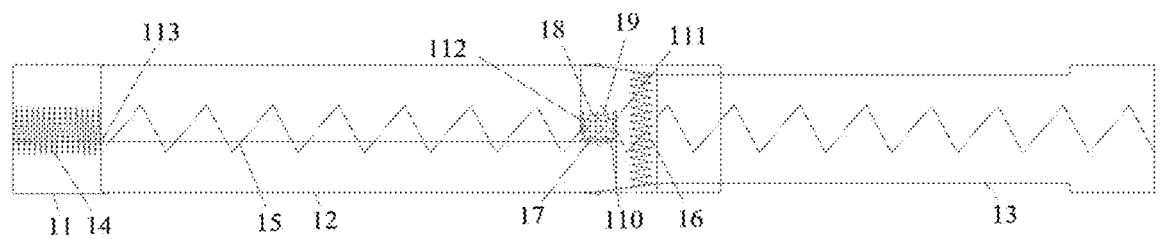
FIG. 2 is a sectional view of an overall structure of a pulse controlling assembly according to an embodiment of the present application.

Referring continuously to FIG. 2, FIG. 2 is a sectional view of an overall structure of the pulse controlling assembly 1, and the present embodiment is intended to further describe the pulse controlling assembly 1. The stretching assembly includes, sequentially arranged in the axial direction: a first hollow bar 11 connected to the transmission bar 7; a second hollow bar 12 movably embedded with the first hollow bar 11; and a third hollow bar 13 movably embedded with the second hollow bar 12. The second hollow bar 12 is provided with one or more windows, and the third hollow bar 13 is provided with one or more clips. Each of the one or more clips is opposite to one of the one or more windows. When the stretching assembly is in the first position state, the each of the one or more clips is clipped inside a corresponding window, and when the stretching assembly is in the second position state, the each of the one or more clips is disengaged from the corresponding window.

As a particular explanation on the present embodiment, the stretching assembly of the pulse controlling assembly 1 includes three hollow bars that are axially nested and connected. The first hollow bar 11 is directly connected to the transmission bar 7, and receives the dynamic-loading compressional wave transferred by the transmission bar 7. The second hollow bar 12 is movably embedded with the first hollow bar 11, and the first hollow bar 11 and the second hollow bar 12 can move relative to each other. The third hollow bar 13 is movably embedded with the second hollow bar 12, the third hollow bar 13 and the second hollow bar 12 can also move relative to each other, and the tail end of the third hollow bar 13 may be connected to the experiment table 8. In some embodiments, the tail end of the third hollow bar 13 is mounted to the experiment table 8 via the hydraulic jack 6.

In some embodiments, in the direction of the transmission of the dynamic-loading compressional wave, the first hollow bar 11 may move relative to the second hollow bar 12, and the second hollow bar 12 may move relative to the third hollow bar 13.

As an example, as shown in FIG. 1, FIG. 1 shows, sequentially from left to right, the first hollow bar 11, the second hollow bar 12 and the third hollow bar 13. All of the three hollow bars are of a shape of a hollow cylindrical tube. The inner diameter of the first hollow bar 11 is slightly greater than the outer diameter of the second hollow bar 12, and the inner diameter of the second hollow bar 12 is slightly greater than the outer diameter of the third hollow bar 13.

The second hollow bar 12 is provided with at least one window, and the third hollow bar 13 is provided with at least one clip that corresponds to the position of the window. When the stretching assembly is in the first position state, the clip is clipped inside the window, and at this moment, the snap-fitting force is greater than the elastic acting force of the elastic assembly, which maintains the original length of the stretching assembly. In other words, the first position state of the stretching assembly may be deemed as the structural characteristic of the stretching assembly when the clip is snap-fitted inside the window. When the stretching assembly is in the second position state, the clip is disengaged from the window, to allow the stretching assembly to contract, and at this moment, the elastic acting force of the elastic assembly is released, so that the second hollow bar 12 moves relative to the third hollow bar 13, to realize the reduction of the length of the stretching assembly structurally. In other words, the second position state of the stretching assembly may be deemed as the structural characteristic of the stretching assembly when the clip has been disengaged from the window.

In some embodiments, the second hollow bar 12 may be provided with one or more windows, and the third hollow bar 13 is correspondingly provided with one or more clips.

It can be understood that the difference between the inner diameters of two hollow bars that are connected may be changed, to realize the relative movement. It can be understood that the windows should be disposed at the hollow bar having the higher inner diameter, and the clips should be disposed at the hollow bar having the lower inner diameter.

In a preferable example, two windows are disposed at the upper surface and the lower surface of the second hollow bar 12, and the clips are disposed at the positions corresponding to the windows of the upper part and the lower part of the third hollow bar 13. The two clips can eject from the windows, thereby the movement toward each other of the second hollow bar 12 and the third hollow bar 13 is restricted. By disposing the two snap-fitting structures, the stability and the reliability of the device can be ensured, to ensure the stable connection of the stretching assembly in the first position state.

The present embodiment is intended to further describe the pulse controlling assembly 1. The elastic assembly includes: a tension-spring set 15 having two ends connected to the second hollow bar 12 and the third hollow bar 13, respectively. When the stretching assembly is in the first position state, the tension-spring set 15 is in the stretching state. When the stretching assembly is in the second position state, the tension-spring set 15 pulls the second hollow bar 12 and the third hollow bar 13 to approach each other, to cause the stretching assembly to contract.

As a particular explanation on the present embodiment, the stretching assembly in the pulse controlling assembly 1 includes three hollow bars that are axially nested and connected, and three spring sets. The tension-spring set 15 is connected to the second hollow bar 12 and the third hollow bar 13. When the stretching assembly is in the first position state, the stretching assembly maintains the original length, and the tension-spring set 15 is in the stretching state, wherein the springs are stretched, and have an elastic acting force having the trend of contracting. When the stretching assembly switches from the first position state to the second position state, the tension-spring set 15 pulls the second hollow bar 12 and the third hollow bar 13 to approach each other, to cause the overall length of the stretching assembly to be reduced, thus the transmission bar 7 and the sample 5 are separated, so that the subsequent dynamic-loading compressional waves cannot act on the sample 5.

Particularly, the two ends of the tension-spring set 15 are connected to the left end of the second hollow bar 12 and the right end of the third hollow bar 13, respectively, the initial state is the stretching state. When the clips of the third hollow bar 13 are moving inwardly, the second hollow bar 12 and the third hollow bar 13 may, under the effect of the tension-spring set 15, move toward each other, thereby the axial length of the entire assembly is reduced.

In a further technical solution, a first compression-spring set 14 among the three spring sets is located between the first hollow bar 11 and the second hollow bar 12, and is in the compression state. By referring to the above embodiments, when the stretching assembly is in the first position state, the tension-spring set 15 and the first compression-spring set 14 are in the stretching state and the compression state, respectively. When the dynamic-loading compressional wave passes through the transmission bar 7 and is transferred to the pulse controlling assembly 1, the restriction by the first compression-spring set 14 is firstly broken to cause the first hollow bar 11 to move rightwardly, and the gear regulating mechanism is triggered and activated by the first hollow bar 11, so that the stretching assembly switches to the second position state, at this moment, the tension-spring set 15 pulls the second hollow bar 12 and the third hollow bar 13 to approach each other.

In a further technical solution, a second compression-spring set 16 among the three spring sets is located inside the third hollow bar 13 and is closer to the clips. When the stretching assembly is in the first position state, the second compression-spring set 16 is in the compression state, to restrict the clips from being disengaged from the windows.

By referring to the above embodiments, when the stretching assembly is in the first position state, the tension-spring set 15, the first compression-spring set 14 and the second compression-spring set 16 are in the stretching state, the compression state and the compression state, respectively.

In the present embodiment, the second compression-spring set 16 is located inside the third hollow bar 13, and, when the gear regulating mechanism is not activated (i.e., the first position state), by using the compression state, applies a radial acting force to control the upper clip and the lower clip in the first position state to be located at the windows, rather than moving inwardly, so that, before the dynamic-loading compressional wave is received, the stretching assembly is maintained to be in the initial state.

In some preferable embodiments, the gear regulating mechanism includes: a gear center bar 17 disposed at the third hollow bar 13; a driving gear 18 and a driven gear 19 that are nested to the periphery of the gear center bar 17; a driving rack 110 having one end disposed at the first hollow bar 11, and other end extending through the second hollow bar 12 and engaged with the driving gear 18; and one or more driven racks that are correspondingly connected to the one or more clips, and are engaged with the driven gear 19.

As a particular explanation on the present embodiment, the stretching assembly of the pulse controlling assembly 1 includes three hollow bars that are axially nested and connected, three spring sets and a gear regulating mechanism. Particularly, the gear center bar 17 is mounted to the third hollow bar 13, to provide support and axis for the gears. Both of the driving gear 18 and the driven gear 19 are nested to the periphery of the gear center bar 17, and the rotation of one of those components synchronously influences the movements of the other components.

In some embodiments, the second hollow bar 12 may be provided with one or more windows, and the third hollow bar 13 is correspondingly provided with one or more clips. One or more driven racks are correspondingly connected to the one or more clips, and each of the driven racks is engaged with the driven gear 19. Preferably, two windows are disposed at the upper surface and the lower surface of the second hollow bar 12, the clips are disposed at the positions corresponding the windows of the upper part and the lower part of the third hollow bar 13, and two driven racks are connected to the two clips.

As a further explanation on the present embodiment, the two driven racks are a first driven rack 111 and a second driven rack 112, and the first driven rack 111 and the second driven rack 112 extend radially in opposite directions, and are correspondingly disposed at the upper clip and the lower clip of the third hollow bar 13.

As an example of the present embodiment, the gear regulating mechanism is formed by the gear center bar 17, the driving gear 18, the driven gear 19, the driving rack 110, the first driven rack 111 and the second driven rack 112. The gear center bar 17 is disposed transversely at the center position of the third hollow bar 13 via a bearing. The driving gear 18 and the driven gear 19 are nested to the gear center bar 17. The driving rack 110 is fixed to the left end of the first hollow bar 11, passes through the left end of the second hollow bar 12, and is engaged with the driving gear 18. At the same time, a limiting stopper 113 is disposed at the rack to restrict the movement of the first hollow bar 11. The two driven racks are connected to the upper clip and the lower clip of the third hollow bar 13, and are engaged with the driven gear 19.

By referring to the above embodiments, when the first hollow bar 11 has received the dynamic-loading impact and broken the restriction by the first compression-spring set 14 to move rightwardly, the driving rack 110 moves rightwardly to drive the driving gear 18 to rotate anticlockwise, the driven gear 19 is rigidly connected to the driving gear 18 via the gear center bar 17 to synchronously rotate anticlockwise, the first driven rack 111 and the second driven rack 112 engaged with the driven gear 19, because of the anticlockwise rotation of the driven gear 19, move inwardly, the clips are disengaged from the restriction by the windows of the second hollow bar 12, and the second hollow bar 12 and the third hollow bar 13, under the effect of the tension-spring set 15, move toward each other, thereby the pulse controlling assembly 1 is overall axially shortened.

In conclusion, in the conventional SHPB experiments, because there is a boundary effect between the bar body and the rock sample, the reflected stretching wave is re-reflected at the end of the incident bar 4 bar that contacts the sample to form a compressional wave, which causes repeated loading on the sample, the sample cannot be caused to bear the impact of a single dynamic-loading compressional wave. As compared with that, the experimentation device according to the embodiments of the present disclosure has at least the following advantages:

By the cooperation of the mechanical components, the pulse controlling assembly 1 can actively shorten the length after impacted by the first dynamic-loading stress wave, so that the rear end of the rock sample loses the supporting base, thereby the single-pulse loading is realized, the variation of the dynamic response of the material after the single dynamic-loading stress wave has passed through the rock sample can be described more accurately.

By adjusting the rigidity of the first compression-spring set 14 and the quantities of the driving gear 18 and the driven gear 19, the sensitivity of the entire structure can be dynamically adjusted, and by using springs of a higher rigidity for the first compression-spring set 14, combined dynamic and static loading of the rock sample can also be realized.

The experimentation device according to the embodiments of the present disclosure can be formed by adding the components to the existing Hopkinson-pressure-bar experimentation device, and has an extensive adaptability.

All of the components in the experimentation device according to the embodiments of the present disclosure cooperate mechanically, which has a high reliability, can be reused, and has a good economic efficiency, at the same time.

Figure 3:
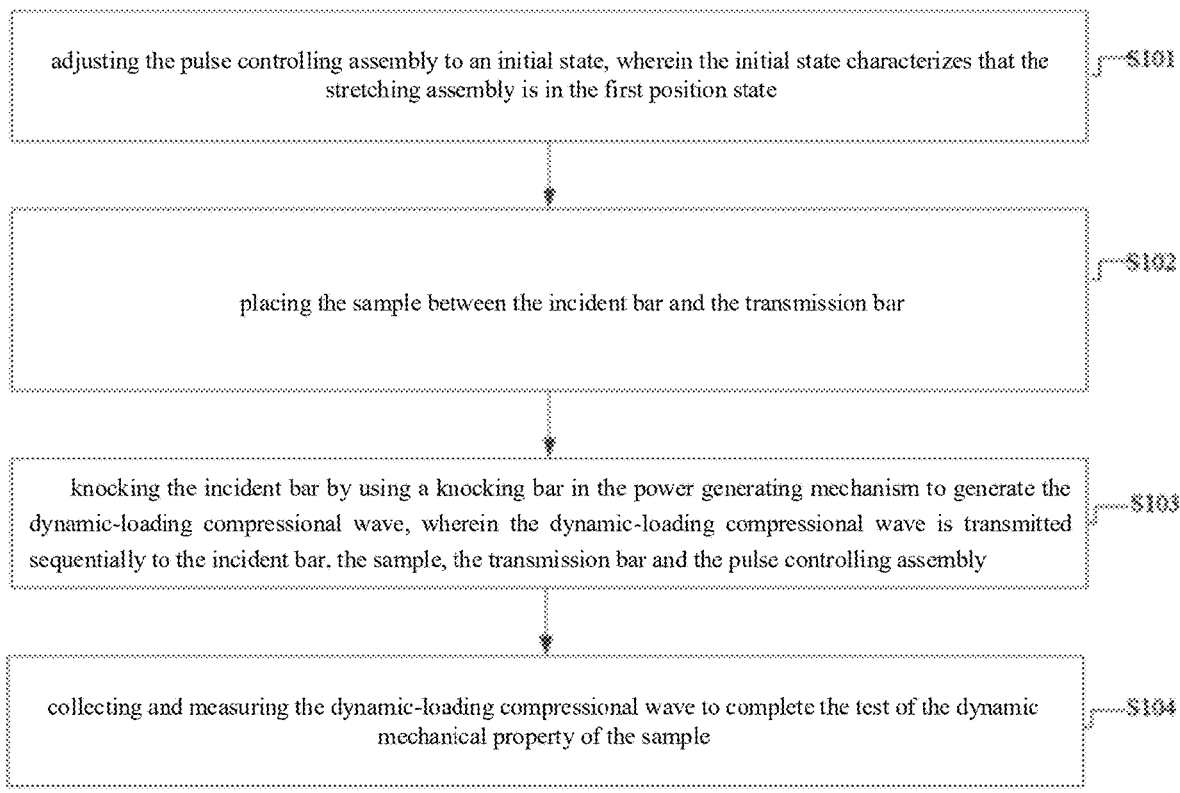
FIG. 3 is a flow chart of the steps of a Hopkinson-pressure-bar experimentation method according to an embodiment of the present application.

A Hopkinson-pressure-bar experimentation method is further provided by the present disclosure. FIG. 3 shows a flow chart of the steps of a Hopkinson-pressure-bar experimentation method according to the present disclosure. The method is for performing a test of the dynamic mechanical property of the sample 5 by using the single-pulse experimentation device based on the Hopkinson pressure bar stated above, and the method includes:

S101: adjusting the pulse controlling assembly 1 to an initial state, wherein the initial state characterizes that the stretching assembly is in the first position state. In the initial state of the experiment, the stretching assembly is in the first position state. When the stretching assembly is in the first position state, the tension-spring set 15, the first compression-spring set 14 and the second compression-spring set 16 are in the stretching state, the compression state and the compression state, respectively.

S102: placing the sample 5 between the incident bar 4 and the transmission bar 7; and fixing a pulse controlling device with the transmission bar 7 and the hydraulic jack 6 of the Hopkinson-pressure-bar experimentation device together coaxially by using an elastic resin adhesive, mounting the incident bar 4, the sample 5, the transmission bar 7 and the pulse controlling assembly 1 from left to right, and, by adjusting the position of the hydraulic jack 6, causing the sample 5 to contact the transmission bar 7.

S103: knocking the incident bar 4 by using the knocking bar 3 in the power generating mechanism 2 to generate the dynamic-loading compressional wave, wherein the dynamic-loading compressional wave is transmitted sequentially to the incident bar 4, the sample 5, the transmission bar 7 and the pulse controlling assembly 1. In the dynamic-loading experiment, the power loading device pushes the knocking bar 3 to knock the incident bar 4 to generate the dynamic-loading shock wave, which sequentially passes through the incident bar 4, the sample 5, the transmission bar 7 and the pulse controlling assembly 1. After the first dynamic-loading shock wave has completed acting, the pulse controlling assembly 1 actively shortens the length, and drives the transmission bar 7 to move rightwardly, so that the rear end of the rock sample loses the base to realize the single-pulse loading.

S104: collecting and measuring the dynamic-loading compressional wave to complete the test of the dynamic mechanical property of the sample 5.

After the step S4, the method may further include:

S105: collecting and destroying a rock sample, preparing the single-pulse loading experiment of the next sample 5, and repeating the steps S101-S104.

As a particular description on the present embodiment, in order to realize the single-pulse loading of the Hopkinson-pressure-bar experiment, in the present disclosure, the length of the transmission bar 7 is reduced to a half of the length of the incident bar 4, at the same time, the pulse controlling assembly 1 is added to the rear end of the transmission bar 7. The left end of the assembly is rigidly connected to the left end of the transmission bar 7 by using a resin adhesive, and at the same time, is rigidly connected to the hydraulic jack 6 at the rear end by using a resin adhesive. The assembly can, after impacted by the dynamic shock wave for the first time, actively shorten the length and drive the transmission bar 7 to move rightwardly to cause the rear end of the rock sample to lose the restriction, so that the subsequent dynamic-loading stress waves cannot act on the rock sample, to realize the single-pulse loading of the rock sample.

In the initial state of the experiment, the stretching assembly is in the first position state. When the stretching assembly is in the first position state, the tension-spring set 15, the first compression-spring set 14 and the second compression-spring set 16 are in the stretching state, the compression state and the compression state respectively. The pulse controlling assembly 1 is located between the transmission bar 7 and the hydraulic jack 6 coaxially. The first hollow bar 11 is rigidly connected to the transmission bar 7 by using a resin adhesive. The third hollow bar 13 is rigidly connected to the hydraulic jack 6 by using a resin adhesive. The first compression-spring set 14 is in the compression state. The clips of the third hollow bar 13, under the effect of the second compression-spring set 16, are restricted at the windows of the second hollow bar 12. The second hollow bar 12 and the third hollow bar 13 are far from each other and are restricted from moving.

When the system is impacted by the dynamic-loading shock wave for the first time, the first hollow bar 11 moves rightwardly, the driving rack 110 synchronously moves rightwardly and drives the driving gear 18 to rotate anti-clockwise. By that the driven gear 19 is rigidly connected to the gear center bar 17, the driven gear 19 synchronously rotates anticlockwise. The first driven rack 111 and the second driven rack 112, under the driving by the anticlock-wise rotation of the driven gear 19, move inwardly, the clips at the upper part and the lower part of the third hollow bar 13 are disengaged from the restriction by the windows of the second hollow bar 12, and switch to the second position state, and the second hollow bar 12 and the third hollow bar 13, under the effect of the tension-spring set 15, move inwardly, thereby the length of the entire structure is shortened. The elastic assembly drives the transmission bar 7 to move rightwardly, the rear end of the rock sample loses the base, so that the subsequent dynamic-loading shock waves cannot continue acting on the rock sample to realize the single-pulse loading of the Hopkinson-pressure-bar experiment.

It should be noted that, regarding the process embodiments, for brevity of the description, all of them are expressed as the combination of a series of actions, but a person skilled in the art should know that the embodiments of the present application are not limited by the sequences of the actions that are described, because, according to the embodiments of the present application, some of the steps may have other sequences or be performed simultaneously. Secondly, a person skilled in the art should also know that all of the embodiments described in the description are preferable embodiments, and not all of the actions that they involve are required by the embodiments of the present application.

Regarding the process embodiments, because they are substantially similar to the system embodiments, they are described simply, and the related parts may be referred to the description on the system embodiments.

It should be noted that the embodiments of the description are described in the mode of progression, each of the embodiments emphatically describes the differences from the other embodiments, and the same or similar parts of the embodiments may be referred to each other.

It should also be noted that, in the present text, the terms that indicate orientation or position relations, such as "upper", "lower", "left", "right", "inside" and "outside", are based on the orientation or position relations shown in the drawings, and are merely for conveniently describing the present disclosure and simplifying the description, rather than indicating or implying that the device or element must have the specific orientation and be constructed and operated according to the specific orientation. Therefore, they should not be construed as a limitation on the present disclosure. Furthermore, relation terms such as "first" and "second" are merely intended to distinguish one entity or operation from another entity or operation, and that does not necessarily require or imply that those entities or operations have therebetween any such actual relation or order, and should not be construed as indicating or implying the degrees of importance. Furthermore, the terms "include", "contain" or any variants thereof are intended to cover non-exclusive inclusions, so that processes, methods, articles or terminal devices that include a series of elements do not only include those elements, but also include other elements that are not explicitly listed, or include the elements that are inherent to such processes, methods, articles or terminal devices.

The single-pulse experimentation device based on the Hopkinson pressure bar and the experimentation method according to the present application have been described in detail above. The principle and the embodiments of the present application are described herein with reference to the particular examples. The description of the above embodiments is merely intended to facilitate to comprehend the present application, and the contents of the description should not be understood as limiting the present application. Moreover, for a person skilled in the art, according to the present application, the particular embodiments and the range of application may be varied in various forms. The embodiments are not required to and cannot be exhaustively listed herein. The obvious variations or modifications that are made on that basis still fall within the protection scope of the present application.

What is claimed is:

1. A single-pulse experimentation device based on a Hopkinson pressure bar, wherein the single-pulse experimentation device comprises an experimentation assembly and a pulse controlling assembly, the experimentation assembly comprises a power generating mechanism, an incident bar and a transmission bar, a space between the incident bar and the transmission bar is for accommodating a sample, and the sample is for bearing and transferring a dynamic-loading compressional wave transmitted by the incident bar;

the pulse controlling assembly comprises:
a stretching assembly that is internally hollow and is connected to the transmission bar; and
an elastic assembly and a gear regulating mechanism that are located inside the stretching assembly and are connected to corresponding positions of the stretching assembly, respectively;
wherein the gear regulating mechanism is configured for driving the stretching assembly to switch between a first position state and a second position state; and
when the stretching assembly has received the dynamic-loading compressional wave propagated by the transmission bar for a first time, the stretching assembly drives the gear regulating mechanism to drive the stretching assembly to switch from the first position state to the second position state, to, in a direction of transmission of the dynamic-loading compressional wave, by using the elastic assembly, drive the stretching assembly to contract, so that the transmission bar and the sample are disengaged from contacting.

2. The single-pulse experimentation device based on the Hopkinson pressure bar according to claim 1, wherein the stretching assembly comprises, sequentially arranged in an axial direction:
a first hollow bar connected to the transmission bar;
a second hollow bar movably embedded with the first hollow bar; and
a third hollow bar movably embedded with the second hollow bar;
wherein the second hollow bar is provided with one or more windows, and the third hollow bar is provided with one or more clips; each of the one or more clips is opposite to one of the one or more windows; and
when the stretching assembly is in the first position state, each of the one or more clips is clipped inside a corresponding window, and when the stretching assembly is in the second position state, each of the one or more clips is disengaged from the corresponding window.

3. The single-pulse experimentation device based on the Hopkinson pressure bar according to claim 2, wherein the elastic assembly comprises:
a tension-spring set having two ends connected to the second hollow bar and the third hollow bar, respectively;
wherein when the stretching assembly is in the first position state, the tension-spring set is in a stretching state; and when the stretching assembly is in the second position state, the tension-spring set pulls the second hollow bar and the third hollow bar to approach each other, to cause the stretching assembly to contract.

4. The single-pulse experimentation device based on the Hopkinson pressure bar according to claim 3, wherein the elastic assembly further comprises:
a first compression-spring set that is located between the first hollow bar and the second hollow bar;
wherein when the stretching assembly is in the first position state, the first compression-spring set is in a compression state.

5. The single-pulse experimentation device based on the Hopkinson pressure bar according to claim 3, wherein the elastic assembly further comprises:
a second compression-spring set that is located inside the third hollow bar and is closer to the one or more clips;
wherein when the stretching assembly is in the first position state, the second compression-spring set is in a compression state, to restrict the one or more clips from being disengaged from the windows.

6. The single-pulse experimentation device based on the Hopkinson pressure bar according to claim 2, wherein the gear regulating mechanism comprises:
a gear center bar disposed at the third hollow bar;
a driving gear and a driven gear that are nested to a periphery of the gear center bar;
a driving rack having one end disposed at the first hollow bar, and other end extending through the second hollow bar and engaged with the driving gear; and
one or more driven racks that are correspondingly connected to the one or more clips, and are engaged with the driven gear.

7. The single-pulse experimentation device based on the Hopkinson pressure bar according to claim 6, wherein a limiting stopper is disposed at one side of the driving rack that is away from the driving gear.

8. The single-pulse experimentation device based on the Hopkinson pressure bar according to claim 1, wherein a length of the incident bar is two times a length of the transmission bar.

9. The single-pulse experimentation device based on the Hopkinson pressure bar according to claim 8, wherein the experimentation assembly further comprises:
a hydraulic jack connected to one end of the stretching assembly that is away from the transmission bar.

10. The single-pulse experimentation device based on the Hopkinson pressure bar according to claim 2, wherein a length of the incident bar is two times a length of the transmission bar.

11. The single-pulse experimentation device based on the Hopkinson pressure bar according to claim 3, wherein a length of the incident bar is two times a length of the transmission bar.

\* \* \* \* \*